June 15, 1937.    F. H. SCANTLEBURY    2,083,924

ILLUMINATED MEASURING DEVICE

Original Filed March 10, 1932

INVENTOR.
FRANCIS H. SCANTLEBURY
BY
ATTORNEY.

Patented June 15, 1937

2,083,924

UNITED STATES PATENT OFFICE 2,083,924

ILLUMINATED MEASURING DEVICE

Francis H. Scantlebury, Brooklyn, N. Y.

Original application March 10, 1932, Serial No. 598,004. Divided and this application July 18, 1935, Serial No. 32,067

7 Claims. (Cl. 240—2.1)

The invention relates to illuminated devices, as of the edge-lighted or back-lighted type and embodying one or more sheets of transparent glass or other transparent or translucent or perforated opaque material bearing suitable designs or configurations, a part of which, at least, is constituted by subdivisions for association with an element caused to move relatively thereto. The said configurations may be illuminated by refracted light entering one or more edges of the glass, or, by light directed therethrough from the rear of said plate.

The invention, for example, may embody illuminated time pieces, measuring apparatus, etc., and is especially adaptable to synchronous electric motor-operated time pieces wherein the power for effecting the operation of the time piece may also serve to provide the desired illumination.

The present application is a division of an application for Letters Patent of the United States of America filed by me March 10, 1932, Serial No. 598,004, since issued as U. S. Patent No. 2,009,210.

The invention has for an object to effectively associate illuminated configurations of a dial or like plate with a movable member or members and in a manner such that these will also be clearly visible when the dial member is illuminated, making the device particularly suitable for use in darkened surroundings, as well as in daylight when the device is not illuminated.

A further object of the invention resides in a simple and inexpensive construction which may readily be adapted, for example, to time pieces of standard construction, and particularly to electrically operated time pieces.

In carrying out the invention, one or more transparent plates of glass or other transparent or translucent, or perforated opaque, material serves to close in whole or in part the front of a suitable case or cabinet for housing the driving mechanism of the movable member or members to be associated with suitable configurations or divisions provided upon said plate or plates and constituting the dial therefor. These configurations may be provided for and illuminated in the case of glass, for example, substantially in the manner more particularly set forth in a prior U. S. Letters Patent #1,707,965, granted to me the 2nd day of April, 1929; or they may be outlined on a plate or provided by stencil cuttings or perforations therein.

Associated with the configurations is a background member or field before which is adapted to operate the movable element or elements; and a shaft or arbor for moving the same is then arranged to project through the background member.

Provision is also made, as through a lamp or lamps located in the case, whereby to illuminate simultaneously the configurations as well as the background before which operates the movable element, said element and background being provided in contrasting colors or preferably as a dark and a light element, respectively, so that the said movable element or elements will be prominently displayed against the illuminated background and will always be clearly visible. Furthermore, the background member may be so constructed as to retain also the plate elements and lamp if desired and will afford thus a compact unit for association with the driving mechanism, both unit and mechanism being located within the case or cabinet housing the driving means for the movable element or elements.

The nature of the invention, however, will best be understood when described in connection with the accompanying drawing, in which.

Figure 1:
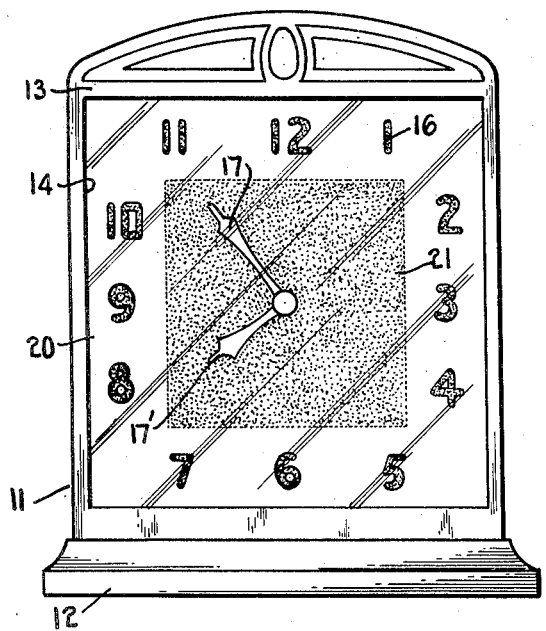
Fig. 1 is a front elevation of the novel illuminated device as embodied in a clock.
Figure 3:
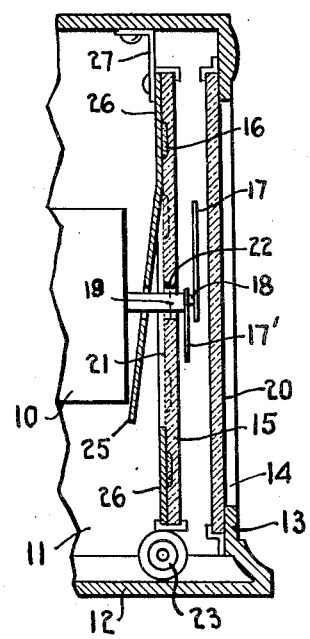
Fig. 3 is a fragmentary vertical section through the device.
Figure 2:
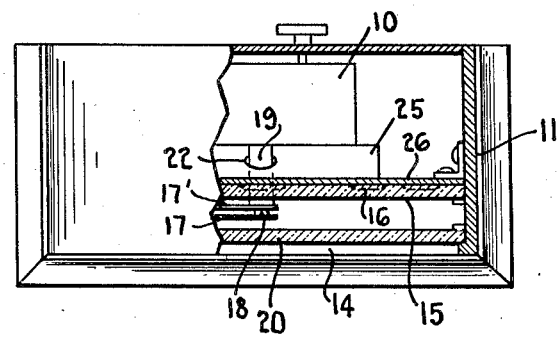
Fig. 2 is a plan thereof with portion of the cover broken away to disclose the interior.

Referring to the drawing, the invention is illustrated as embodied in a time piece, more particularly of the synchronous electric motor-operated type, although the invention is not to be understood as being restricted to clocks of this type, as the ordinary spring-operated clock may also be employed, particularly where alternating current is not available. Also, the invention is applicable to other measuring apparatus embodying a scale or the like and a member movable in relation thereto.

The entire mechanism, including the motor 10, is shown as housed within a suitable cabinet or the like 11 mounted upon a base 12. The front wall 13 of the cabinet is provided with an aperture 14 to expose the face or dial of the clock, said opening in the present instance being square, but, of course, the particular design of the opening may be varied as desired.

Through this aperture 14 is visible a dial plate 15 carrying the desired design or configurations such as the time subdivisions or numerals 16 and any other ornamentation or the like as may be desired. Through the central portion of this dial and the aperture 14 are also visible the hands 17 and 17' of the clock, the same being mounted upon arbors 18 and 19 driven from the clock motor 10 in the usual manner.

The dial 15 is in the nature of a plate which may serve to close the front portion of the housing but in the present embodiment an additional glass plate 20 is provided over the hands. Dial 15 is constructed preferably of a transparent plate of glass in which the configurations 16 are etched as by sand-blasting or the like, and as is more particularly set forth in my aforesaid prior U. S. Letters Patent, to provide the desired design. However, the dial may be variously constructed as set forth in my aforesaid application Serial No. 598,004.

The configuration-bearing element or dial plate 15 has associated therewith a background element which is preferably arranged to lie in one and the same plane therewith and is constituted as a translucent field portion of the dial itself. Thus, the central portion of this plate 15 is etched or frosted as at 21 and the said frosted portion is centrally perforated as at 22 to pass therethrough the driving arbors 18 and 19 for the respective hour and minute hands 17' and 17, said arbors being driven from the clock mechanism 10 contained within the cabinet 11. The etching or frosting of the central field portion 21 is preferably to a depth less than that of the configurations 16 surrounding the same and the configurations, particularly over the upper portion of the plate, will therefore receive ample illumination from a suitable lamp or the like 23 located in the base 12 of the cabinet 11 and beneath the lower edge of the plate 15.

This edge-illumination of the plate will serve to a more or less degree to illuminate the central or field portion which is shown as a centrally disposed translucent square surrounded by a clear portion of the glass and in which are disposed the configurations or time subdivisions 16. It is desirable, however, to increase the illumination of this central or field portion and in front of which the hands 17 and 17' are adapted to move.

To this end, provision is made for back-lighting this central portion as in the provision of a reflector element which may be constituted by a cut-out flap or the like 25 from a strip of sheet metal or like opaque material 26 backing the glass plate 15 and secured thereto, for example, by means of a suitable adhesive or the like. This plate affords also a means for securing the plate to the cabinet 11 as in the use of a bracket 27; and the flap 25 is also perforated to pass the arbors 18 and 19 of the clock mechanism. By bending back this flap at an angle, substantially as shown, a space will be provided between the bottom edge of the flap and the strip of metal to admit light from the lamp 23. Furthermore, the surface of the flap may be polished so that the same will serve to reflect this light to the frosted or etched portion 21 and effect the desired illumination thereof.

Thus, not only will the numerals or time subdivisions 16 on the plate 15 be illuminated, but an illuminated background or field 21 for the hands 17 and 17' is provided.

I claim:

1. An illuminated device, comprising a transparent plate having etched configurations, an associated translucent etched portion of substantial area, an element movable before the associated portion, and means to edge-illuminate the said configurations, and an opaque element backing the etched configurations and affording a reflecting surface to back-light the said associated portion.

2. An illuminated device, comprising a transparent plate having a central etched portion and etched configurations disposed about the same, hands movable before the central portion, means passing through the central portion for rotating the hands, a lamp to edge-illuminate the said configurations, and a reflector element behind the plate to direct light from the lamp to the back of the said central portion to afford an illuminated background for the hands.

3. An illuminated device, comprising a transparent plate having a central etched portion affording a light-transmitting field, and etched configurations disposed about the same, hands movable before the central portion, means passing through the central portion for rotating the hands, a lamp to edge-illuminate the configurations on said configuration-bearing plate, and a reflector element behind the plate to direct light from the lamp to the back of the said central portion to afford an illuminated background for the hands.

4. An illuminated device, comprising a transparent plate having a central etched portion and etched configurations disposed about the same, hands movable before the central portion, means passing through the central portion for rotating the hands, a lamp to edge-illuminate the said configurations, and an opaque plate carrying the transparent plate and having a portion offset therefrom to afford a reflecting surface behind the said central etched portion of the transparent plate to direct light from the lamp to the back of said central portion to illuminate the same.

5. In an illuminated device: a light-transmitting element having a plurality of illuminable associated portions disposed thereover, at least one of which is capable of edge-illumination and another of back-illumination, together with a source of light common thereto, invisible through the said light-transmitting element and so located with respect thereto as to permit part of the light rays therefrom to pass into the plate to edge-illuminate said edge-illuminable portion, and reflector means to direct other rays from said source to back illuminate said back-illuminable portion.

6. In an illuminated device: the combination with a configuration-bearing element with opaque backing for the configuration portion thereof and an associated translucent field within the configurations, and an element movable before the field in proximity to the configurations; of a source of light invisible from the front of the device and so located therein as to permit part of the light rays therefrom to pass into the configuration-bearing element through an edge thereof to edge-illuminate thereby the configurations, and reflector means behind said element to direct other rays from said source to back-light said translucent field.

7. An illuminated device, comprising a transparent plate having a central etched portion of substantial area and etched configurations disposed about the same with opaque backing therefor, an element movable before the central portion, a source of light invisible from the front of the device and so located therein as to permit part of the light rays therefrom to pass into the configuration-bearing element through an edge thereof to edge-illuminate thereby the configurations, and reflector means behind said plate to direct other rays from said source to back-light the central portion and reinforce the illumination of more distant configurations.

FRANCIS H. SCANTLEBURY.